United States Patent
Kim (10) Patent No.: US 10,486,728 B2
(45) Date of Patent: Nov. 26, 2019

(54) COLLAPSIBLE DOLLY ASSEMBLY

(71) Applicant: Emily Kim, Wilmette, IL (US)

(72) Inventor: Emily Kim, Wilmette, IL (US)

( * ) Notice: Subject to any disclaimer, the term of this patent is extended or adjusted under 35 U.S.C. 154(b) by 253 days.

(21) Appl. No.: 15/589,824

(22) Filed: May 8, 2017

(65) Prior Publication Data

US 2018/0319418 A1 Nov. 8, 2018

(51) Int. Cl.
| | |
|---|---|
| *B62B 3/00* | (2006.01) |
| *B62B 3/02* | (2006.01) |
| *B62B 5/02* | (2006.01) |
| *B62B 5/04* | (2006.01) |
| *B62B 5/06* | (2006.01) |

(52) U.S. Cl.
CPC .............. *B62B 5/025* (2013.01); *B62B 3/008* (2013.01); *B62B 3/022* (2013.01); *B62B 5/049* (2013.01); *B62B 5/0438* (2013.01); *B62B 5/06* (2013.01); *B62B 2205/06* (2013.01)

(58) Field of Classification Search
CPC ........... B62B 3/008; B62B 3/02; B62B 3/022; B62B 5/02; B62B 5/025; B62B 5/04; B62B 5/0438; B62B 5/049; B62B 5/06; B62B 2205/06
See application file for complete search history.

(56) References Cited

U.S. PATENT DOCUMENTS

| | | | |
|---|---|---|---|
| 2,467,644 A | 4/1949 | Wright et al. | |
| 3,137,511 A * | 6/1964 | Weil | A61G 5/006 280/30 |
| 3,655,212 A * | 4/1972 | Krass | B62B 3/04 280/47.2 |
| 4,046,391 A | 9/1977 | Restad et al. | |
| 4,130,291 A * | 12/1978 | Saethre | B62B 5/025 280/5.22 |
| 4,307,892 A | 12/1981 | Miles | |
| 4,681,330 A | 7/1987 | Misawa | |
| 5,269,544 A | 12/1993 | Park | |
| 5,868,403 A * | 2/1999 | Culp | A61G 5/061 280/5.22 |
| 5,947,491 A | 9/1999 | Meier | |

(Continued)

FOREIGN PATENT DOCUMENTS

WO WO2010123549 10/2010

*Primary Examiner* — Joseph M Rocca
*Assistant Examiner* — Maurice L Williams (57) ABSTRACT

A collapsible dolly assembly includes a pair of frames that are each selectively urged between a deployed position and a collapsed position. A pair of rear wheels is rotatably coupled to the frame to roll along a support surface. A pair of front wheels is rotatably coupled to the frame to roll along the support surface. A dolly is hingedly coupled to the frame to support an object thereby facilitating the object to be transported along the support surface. A pair of skid units is movably coupled to an associated one of the frames. Each of the skid units is selectively positioned in a deployed position. In this way each of the skid units frictionally engages a staircase thereby facilitating the object to be urged upwardly and downwardly along the staircase. A braking unit is movably coupled to the frame to selectively engage the staircase when the skid unit is positioned in the deployed position. Thus, the braking unit retains the object at a selected point along the staircase.

17 Claims, 6 Drawing Sheets

(56) References Cited

U.S. PATENT DOCUMENTS

| | | | | |
|---|---|---|---|---|
| 6,561,524 B1* | 5/2003 | Medina | | A61G 5/061 |
| | | | | 280/250.1 |
| 8,556,279 B2 | 10/2013 | McKinnon | | |
| 8,640,798 B2* | 2/2014 | Walkingshaw | | A61G 5/066 |
| | | | | 180/9.32 |
| 8,641,058 B2* | 2/2014 | Torrison | | B60T 1/04 |
| | | | | 280/47.131 |
| D709,664 S | 7/2014 | Plummer | | |
| 2003/0132585 A1* | 7/2003 | Way | | A61G 5/061 |
| | | | | 280/5.22 |
| 2006/0191724 A1* | 8/2006 | Mairose | | B62B 5/02 |
| | | | | 180/8.2 |
| 2007/0095581 A1* | 5/2007 | Chambliss | | A61G 5/061 |
| | | | | 180/8.2 |
| 2008/0203687 A1* | 8/2008 | Meyers | | B62B 1/002 |
| | | | | 280/47.18 |
| 2008/0272563 A1* | 11/2008 | Tsai | | B62B 3/008 |
| | | | | 280/38 |
| 2008/0272629 A1* | 11/2008 | Walkingshaw | | A61G 1/013 |
| | | | | 297/118 |
| 2010/0181736 A1* | 7/2010 | Price | | B62B 3/02 |
| | | | | 280/38 |
| 2011/0175302 A1* | 7/2011 | Sherman | | A61G 5/066 |
| | | | | 280/5.22 |
| 2012/0098218 A1* | 4/2012 | Richard | | B62B 5/0438 |
| | | | | 280/47.24 |
| 2012/0161408 A1* | 6/2012 | Sidhu | | A45C 5/14 |
| | | | | 280/47.38 |
| 2012/0286498 A1* | 11/2012 | Baldemor | | B62B 1/002 |
| | | | | 280/651 |
| 2014/0271095 A1* | 9/2014 | Umans | | B62B 1/12 |
| | | | | 414/800 |
| 2015/0001020 A1* | 1/2015 | Dondurur | | A45C 5/143 |
| | | | | 190/18 A |
| 2015/0137487 A1* | 5/2015 | Su | | B62B 3/022 |
| | | | | 280/655 |

* cited by examiner

COLLAPSIBLE DOLLY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to dolly devices and more particularly pertains to a new dolly device for transporting an object up and down a staircase.

BRIEF SUMMARY OF THE INVENTION

An embodiment of the disclosure meets the needs presented above by generally comprising a pair of frames that are each selectively urged between a deployed position and a collapsed position. A pair of rear wheels is rotatably coupled to the frame to roll along a support surface. A pair of front wheels is rotatably coupled to the frame to roll along the support surface. A dolly is hingedly coupled to the frame to support an object thereby facilitating the object to be transported along the support surface. A pair of skid units is movably coupled to an associated one of the frames. Each of the skid units is selectively positioned in a deployed position. In this way each of the skid units frictionally engages a staircase thereby facilitating the object to be urged upwardly and downwardly along the staircase. A braking unit is movably coupled to the frame to selectively engage the staircase when the skid unit is positioned in the deployed position. Thus, the braking unit retains the object at a selected point along the staircase.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
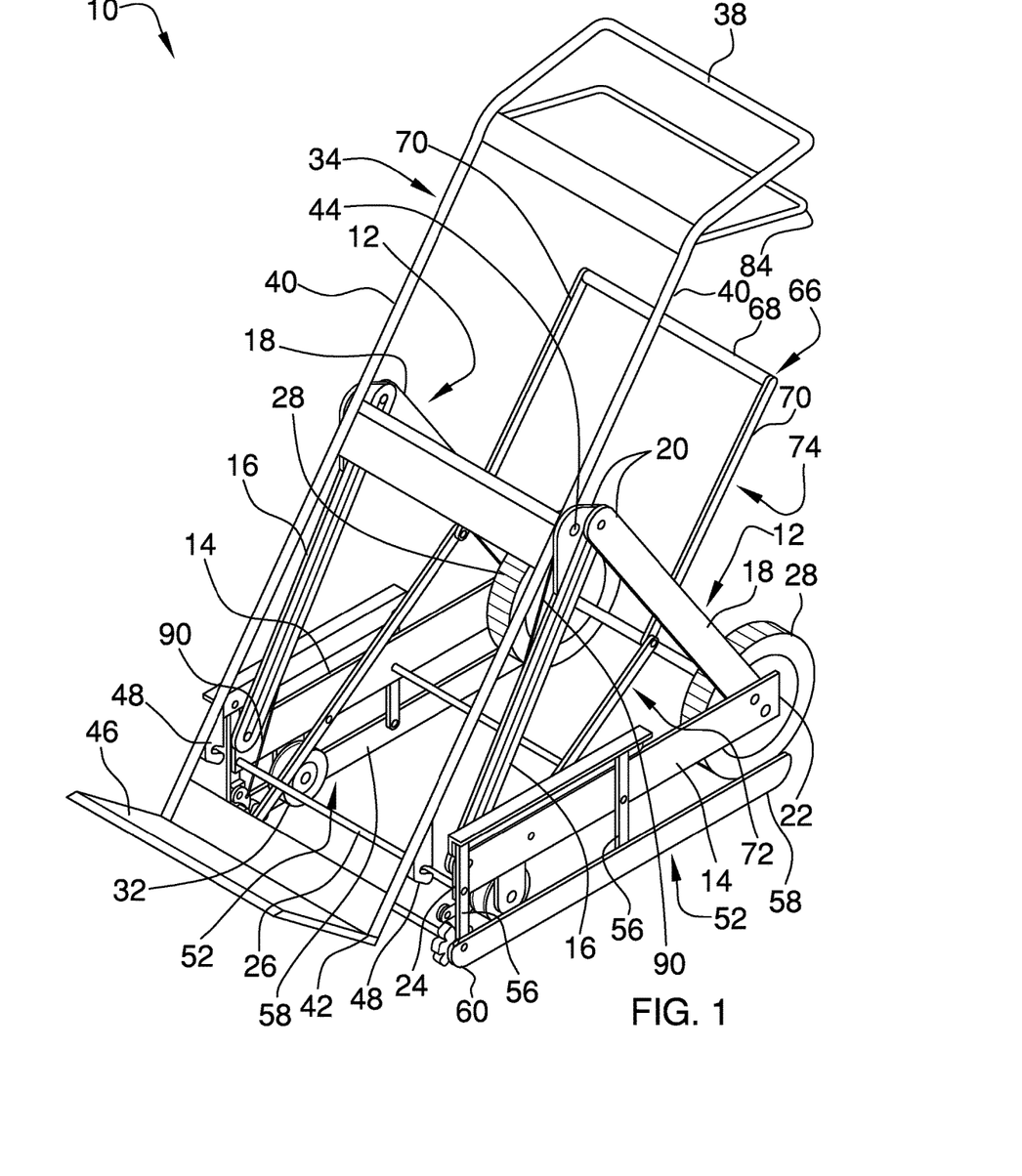
FIG. 1 is a perspective view of a collapsible dolly assembly according to an embodiment of the disclosure.
Figure 2:
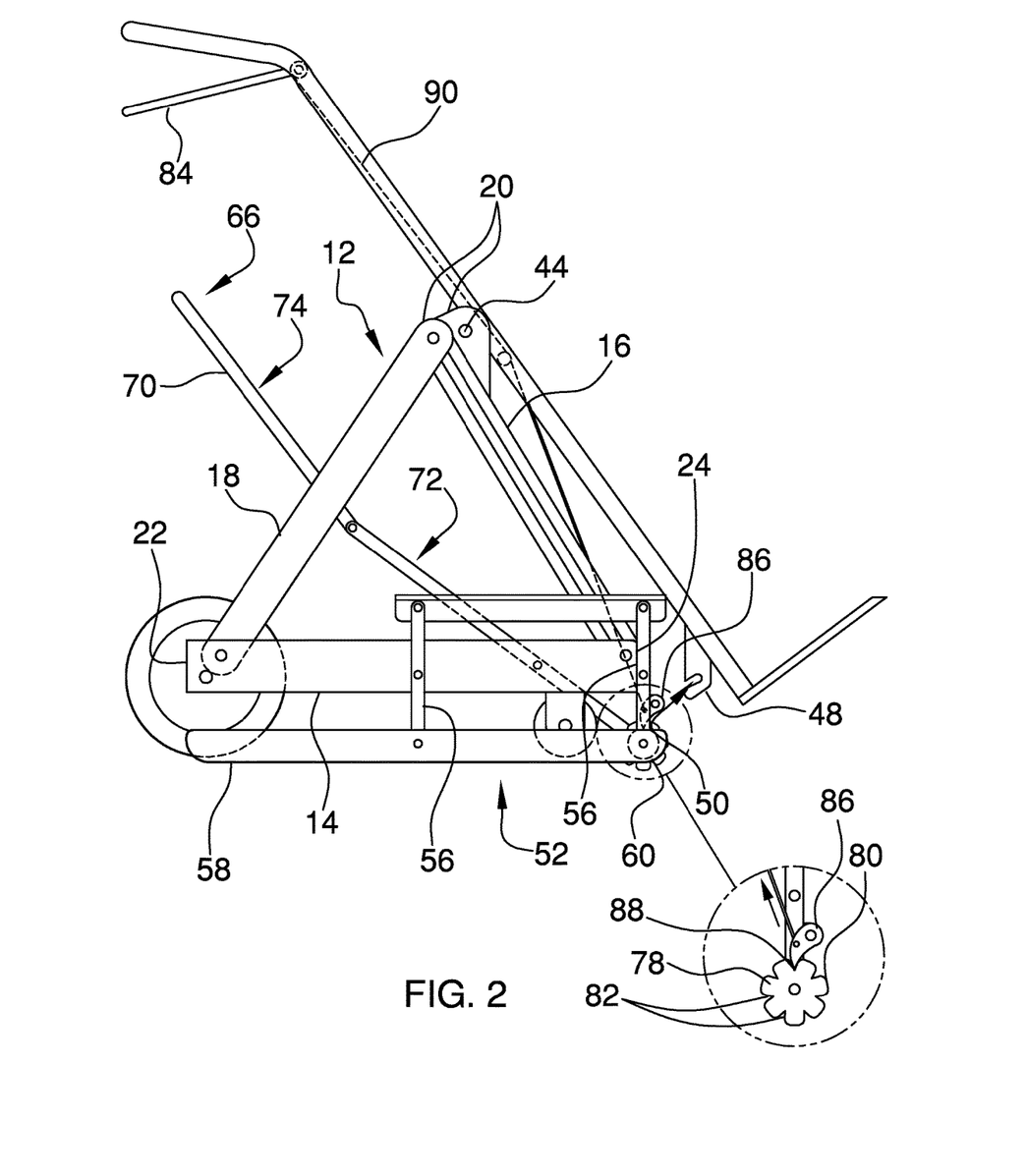
FIG. 2 is a right side phantom view of an embodiment of the disclosure.
Figure 3:
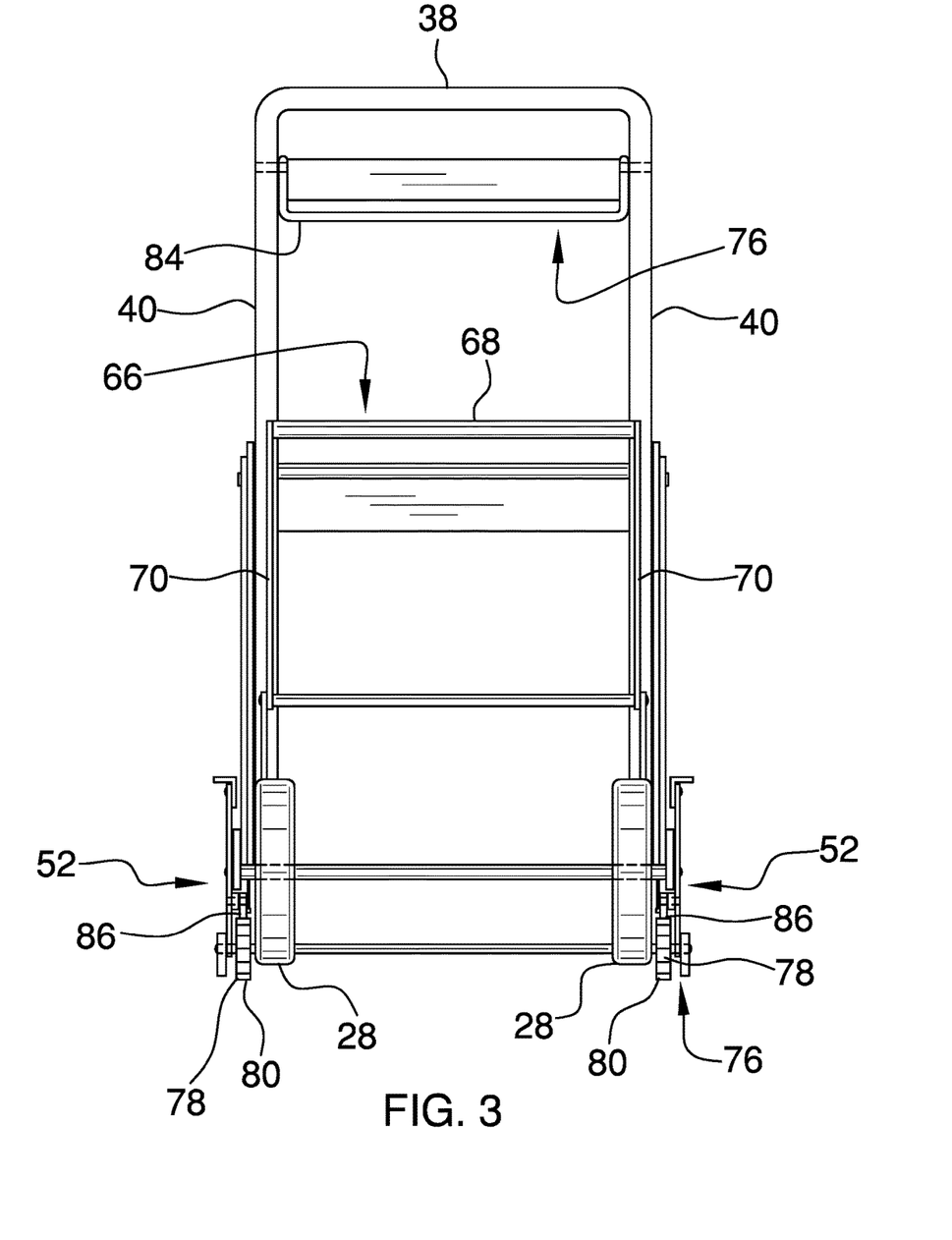
FIG. 3 is a back view of an embodiment of the disclosure.
Figure 4:
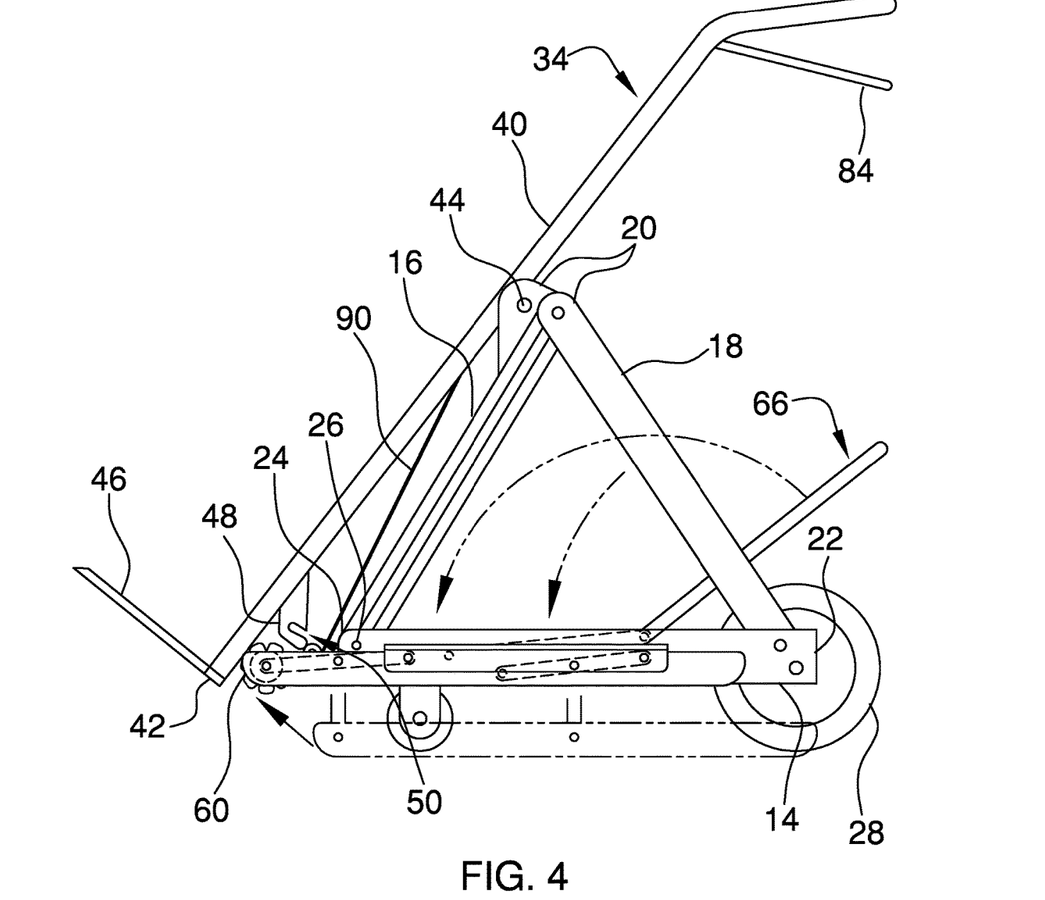
FIG. 4 is a left side phantom view of an embodiment of the disclosure showing a handle being urged into a folded position.
Figure 5:
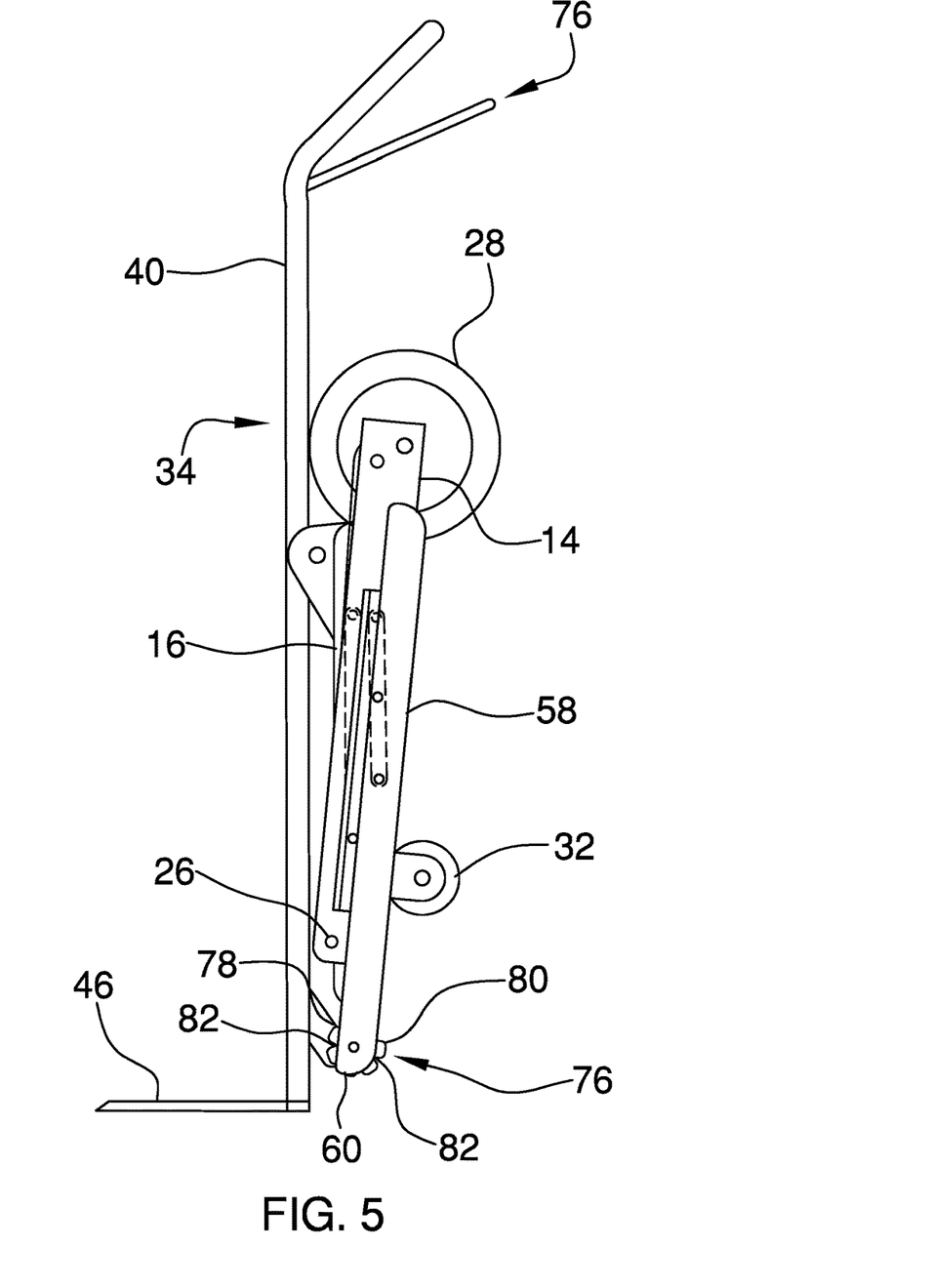
FIG. 5 is a left side view of an embodiment of the disclosure showing a pair of frames in a folded position.
Figure 6:
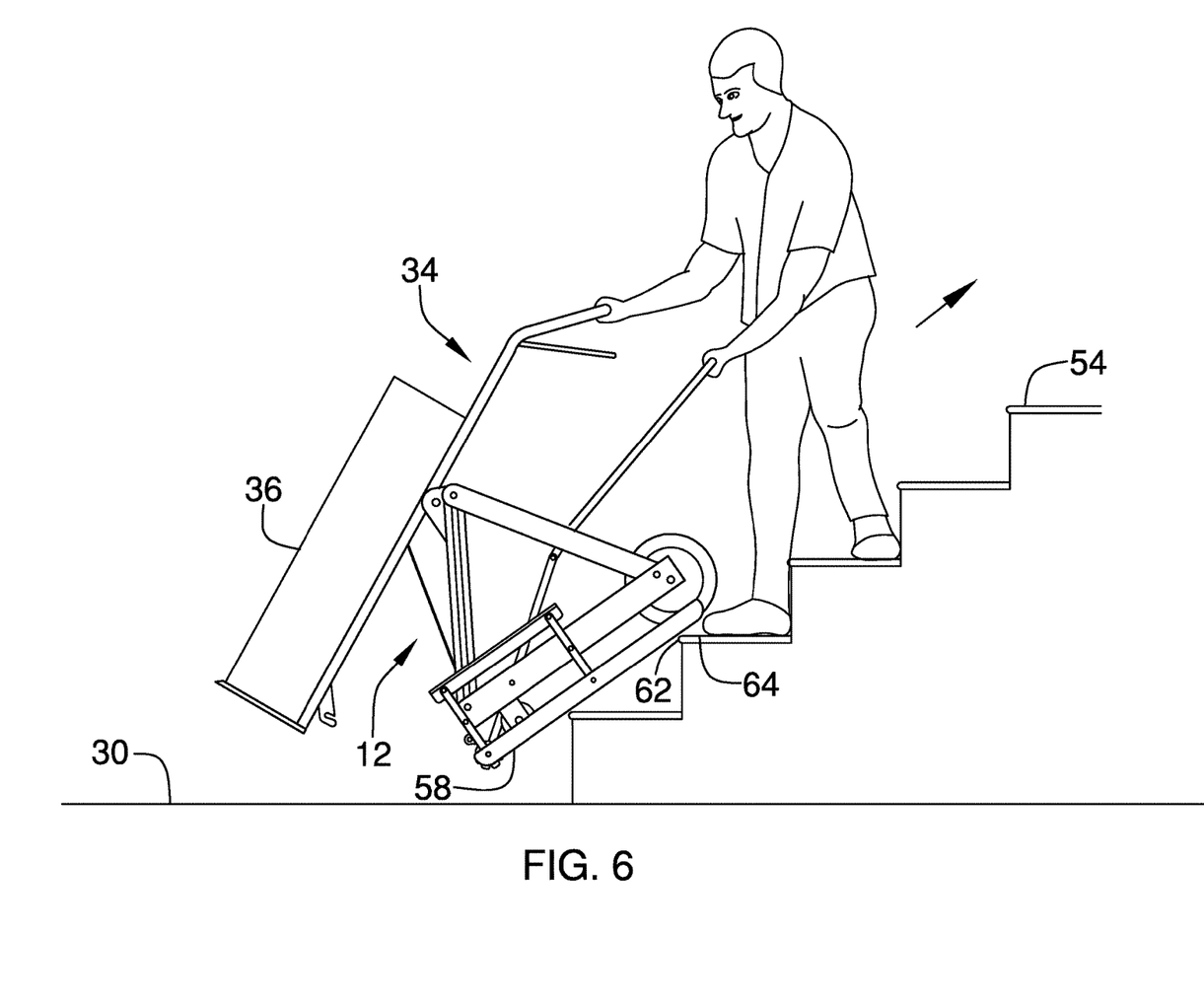
FIG. 6 is a perspective in-use view of an embodiment of the disclosure.

With reference now to the drawings, and in particular to FIGS. 1 through 6 thereof, a new dolly device embodying the principles and concepts of an embodiment of the disclosure and generally designated by the reference numeral 10 will be described.

As best illustrated in FIGS. 1 through 6, the collapsible dolly assembly 10 generally comprises a pair of frames 12 that is each selectively urged between a deployed position and a collapsed position. Each of the frames 12 comprises a first member 14 that is pivotally coupled between a second member 16 and a third member 18. Each of the second 16 and third 18 members has a distal end 20 with respect to the first member 14. Moreover, the distal end 20 of the third member 18 is slidably coupled to the second member 16 such that each of the frames 12 has a triangular shape when each of the frames 12 is positioned in the deployed position.

Each of the second 16 and third 18 members is oriented collinear with the first member 14 when each of the frames 12 is in the collapsed position. The pair of frames 12 is spaced apart from each other and the first member 14 corresponding to each of the frames 12 has a first end 22 and a second end 24. The distal end 20 of the third member 18 is slid downwardly along the second member 16 when the pair of frames 12 is positioned in the folded position. In this way the distal end 20 of the third member 18 is aligned with the second end 24 of the first member 14. A first rod 26 is coupled between the first member 14 of each of the frames 12 and the first rod 26 is aligned with the second end of each of the frames 12.

A pair of rear wheels 28 is provided and each of the rear wheels 28 is rotatably coupled to the frames 12 to roll along a support surface 30. Each of the rear wheels 28 is aligned with the first end corresponding to an associated one of the frames 12. A pair of front wheels 32 is provided and each of the front wheels 32 is rotatably coupled to the frame to roll along the support surface 30. Each of the front wheels 32 is aligned with the second end 24 corresponding to an associated one of the frames 12. Additionally, each of the rear wheels 28 may have a diameter that is larger than a diameter of the front wheels 32.

A dolly 34 is hingedly coupled to the frames 12 and the dolly 34 selectively supports 56 an object 36. In this way the object 36 may be transported along the support surface 30. The object 36 may be any object 36 that is too heavy to be carried by a single person. Additionally, the dolly 34 is selectively positioned between a first position and a second position.

The dolly 34 comprises a shaft 38 extending between a pair of outward members 40 and the shaft 38 is selectively gripped in the convention of a handle. Each of the outward members 40 has a distal end 42 with respect to the shaft 38 and each of the outward members 40 has a connection point 44 that is centrally positioned on the outward members 40. The connection point 44 corresponding to each of the outward members 40 is pivotally coupled to the distal end 20 of the second member 16 corresponding to an associated one of the frames 12. A plate 46 is coupled to and extends away from the outward members 40. The plate 46 is oriented perpendicular to the outward members 40 and the object 36 is placed on the plate 46 having the object 36 lying on each of the outward members 40. The plate 46 is aligned with the distal end corresponding to each of the outward members 40.

A pair of tabs 48 is provided and each of the tabs 48 is coupled to and extends away from an associated one of the outward members 40. Each of the tabs 48 is positioned closer to the distal end 42 of the outward members 40 than the shaft 38. Each of the tabs 48 has a slot 50 extending inwardly thereon. The slot 50 corresponding to each of the tabs 48 engages the first rod 26 when the dolly 34 is positioned in the first position. In this way the dolly 34 is retained in the first position having the plate 46 being positioned proximate the support surface 30. Each of the tabs 48 releases the first rod 26 when the dolly 34 is positioned in the second position. In this way the plate 46 is selectively urged upwardly with respect to the support surface 30 to substantially lift the object 36 from the support surface 30.

A pair of skid units 52 is provided and each of the skid units 52 is movably coupled to an associated one of the frames 12. Each of the skid units 52 is selectively positioned in a stored position having each of the skid units 52 being spaced from the support surface 30. Each of the skid units 52 is selectively positioned in a deployed position. In this way each of the skid units 52 may frictionally engage a staircase 54 thereby facilitating the object 36 to be urged upwardly and downwardly along the staircase 54.

Each of the skid units 52 comprises a pair of supports 56 and each of the supports 56 is pivotally coupled to the first member 14 of the associated frame. The supports 56 are spaced apart from each other. Moreover, each of the supports 56 extends downwardly from the associated frame 12 when the skid units 52 are positioned in the deployed position. Each of the supports 56 is oriented collinear with the first member 14 of the associated frame 12 when the skid units 52 are positioned in the stored position.

Each of the skid units 52 further includes a skid 58 that is pivotally coupled between each of the supports 56 and each of the skids 58 has a forward end 60. The skid 58 is spaced below the first member 14 of the associated frame when the skid units 52 are positioned in the deployed position. In this way the skid 58 is positioned to frictionally engage a nose 62 of a tread 64 on the staircase 54. The skid 58 is oriented collinear with the first member 14 of the associated frame when the skid units 52 are positioned in the stored position. Thus, each of the front 32 and rear 28 wheels may roll along the support surface 30.

A handle 66 is movably coupled to the skid 58 corresponding to each of the skid units 52 and the handle 66 is selectively manipulated. The handle 66 urges each of the skid units 52 between the stored position and the deployed position. The handle 66 includes a secondary member 68 extending between a pair of primary members 70. Each of the primary members 70 includes a first half 72 that is hingedly coupled to a second half 74. The first half 72 corresponding to each of the primary members 70 is pivotally coupled to the corresponding skid 58 and the secondary member 68 is gripped to manipulate the handle 66. The secondary member 68 is urged downwardly to position each of said skid units 52 in the deployed position. Additionally, the second half 74 corresponding to each of the primary members 70 is selectively folded onto the first half 72 for storing the handle 66. The secondary member 68 is positioned between the shaft 38 of the dolly 34 and each of the rear wheels 28 when the primary members 70 are unfolded.

A braking unit 76 is movably coupled to the frame and the braking unit 76 selectively engages the staircase 54 when the skid 58 unit is positioned in the deployed position. In this way the braking unit 76 retains the object 36 at a selected point along the staircase 54. The braking unit 76 comprises a pair of braking wheels 78 that is each rotatably coupled to an associated one of the skids 58. Each of the braking wheels 78 is aligned with the forward end 60 of the associated skid 58 and each of the braking wheels 78 has a peripheral edge 80.

The peripheral edge 80 corresponding to each of the braking wheels 78 has a plurality of notches 82 extending toward a center of the corresponding braking wheel 78. The notches 82 on each of the braking wheels 78 are spaced apart from each other and are distributed around the corresponding braking wheel 78. Selected ones of the notches 82 on each of the braking wheels 78 engage the nose 62 on the tread 64 of the staircase 54 when the skid units 52 are positioned in the deployed position. A lever 84 is hingedly coupled to the dolly 34 and the lever 84 is selectively manipulated.

A pair of fingers 86 is provided and each of the fingers 86 is pivotally coupled to an associated one of the supports 56 corresponding to the skid units 52. Each of the fingers 86 has a distal end 88 with respect to the associated support 56. Moreover, each of the fingers 86 is biased into a locking position such that the distal end 88 corresponding to each of the fingers 86 engages a corresponding one of the notches 82 in an associated one of the braking wheels 78. In this way each of the braking wheels 78 is inhibited from rotating. Each of the fingers 86 is selectively urged into a releasing position having each of the fingers 86 being spaced from the associated braking wheel 78. A pair of cables 90 is provided and each of the cables 90 is coupled between the lever 84 and an associated one of the fingers 86. In this way each of the fingers 86 are urged between the locking position and the releasing position when the lever 84 is manipulated.

In use, each of the frames 12 is urged into the deployed position and the dolly 34 is manipulated to urge the plate 46 beneath the object 36. The shaft 38 on the dolly 34 is urged downwardly to lift the object 36 and each of the front 32 and rear 28 wheels rolls along the support surface 30 to transport the object 36. Each of the rear wheels 28 is aligned with the staircase 54 when the object 36 is to be transported up the staircase 54. The secondary member 68 of the handle 66 is gripped and each of the primary members 70 is unfolded.

The secondary member 68 is urged downwardly to position each of the skid units 52 in the deployed position. The shaft 38 on the dolly 34 is urged downwardly to raise the object 36 and the secondary member 68 is lifted to position each of the skids 58 on the nose 62 of the staircase 54 thereby inhibiting each of the front 32 and rear 28 wheels from engaging the staircase 54. In this way the dolly 34 is slid upwardly along the staircase 54 to transport the object 36 up the staircase 54.

Selected notches 82 in each of the braking wheels 78 engage the nose 62 on each of the treads 64 as the dolly 34 is slid upwardly along the staircase 54. Moreover, each of the fingers 86 is biased to engage the associated braking wheel 78 thereby inhibiting the dolly 34 from travelling downwardly along the staircase 54. The lever 84 is manipulated to position each of the fingers 86 in the releasing position thereby facilitating each of the braking wheels 78 to rotate when the dolly 34 is urged upwardly on the staircase 54. Additionally, the dolly 34 is selectively urged downwardly along the staircase 54 to transport the object 36 down the staircase 54. The first member 14 corresponding to each of the frames 12 is selectively manipulated to slide downwardly along the associated second member 16. In this way each of the frames 12 is positioned in the folded position for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible dolly assembly being configured to be selectively urged upwardly and downwardly along a staircase thereby facilitating an object to be transported upwardly and downwardly on the staircase, said assembly comprising:
   a pair of frames, each of said frames being selectively urged between a deployed position and a collapsed position;
   a pair of rear wheels, each of said rear wheels being rotatably coupled to an associated one of said frames wherein each of said rear wheels is configured to roll along a support surface;
   a pair of front wheels, each of said front wheels being rotatably coupled to an associated one of said frames wherein each of said front wheels is configured to roll along the support surface;
   a dolly being hingedly coupled to said frames wherein said dolly is configured to support an object thereby facilitating the object to be transported along the support surface, said dolly being selectively positioned between a first position and a second position;
   a pair of skid units, each of said skid units being movably coupled to an associated one of said frames, each of said skid units being selectively positioned in a stored position wherein each of said skid units is configured to be spaced from the support surface, each of said skid units being selectively positioned in a deployed position wherein each of said skid units is configured to frictionally engage a staircase thereby facilitating the object to be urged upwardly and downwardly along the staircase;
   a braking unit being movably coupled to said frames wherein said braking unit is configured to selectively engage the staircase when said skid unit is positioned in said deployed position wherein said braking unit is configured to retain the object at a selected point along the staircase; and
   wherein each of said frames comprises a first member being pivotally coupled between a second member and a third member, each of said second and third members having a distal end with respect to said first member, said distal end of said third member being slidably coupled to said second member such that each of said frames has a triangular shape when each of said frames is positioned in said deployed position, each of said second and third members being oriented collinear with said first member when each of said frames is in said collapsed position, said pair of frames being spaced apart from each other.

2. The assembly according to claim 1, wherein said first member corresponding to each of said frames has a first end and a second end, said distal end of said third member being slid downwardly along said second member when said pair of frames is positioned in said collapsed position having said distal end of said third member being aligned with said second end of said first member.

3. The assembly according to claim 2, further comprising a first rod being coupled between said first members of each of said frames, said first rod being aligned with said second end of each of said frames.

4. The assembly according to claim 2, wherein:
   each of said rear wheels is aligned with said first end of said first member corresponding to said associated one of said frames; and
   each of said front wheels being aligned with said second end of said first member corresponding to said associated one of said frames.

5. The assembly according to claim 1, wherein said dolly comprises a shaft extending between a pair of outward members wherein said shaft is configured to be gripped, each of said outward members having a distal end with respect to said shaft, each of said outward members having a connection point being centrally positioned on said outward members, said connection point corresponding to each of said outward members being pivotally coupled to said distal end of said second member corresponding to an associated one of said frames.

6. The assembly according to claim 5, further comprising a plate being coupled to and extending away from said outward members, said plate being oriented perpendicular to said outward members wherein said plate is configured to have the object placed thereon having the object lying on each of said outward members, said plate being aligned with said distal end corresponding to each of said outward members.

7. The assembly according to claim 5, further comprising a pair of tabs, each of said tabs being coupled to and extending away from an associated one of said outward members, each of said tabs being positioned closer to said distal end of said outward members than said shaft.

8. The assembly according to claim 7, further comprising:
a first rod; and
each of said tabs has a slot extending inwardly thereon, said slot corresponding to each of said tabs engaging said first rod when said dolly is positioned in said first position to retain said dolly in said first position wherein said plate is configured to be positioned proximate the support surface, each of said tabs releasing said first rod when said dolly is positioned in said second position thereby facilitating said plate to be urged upwardly with respect to the support surface wherein said dolly is configured to substantially lift the object from the support surface.

9. The assembly according to claim 1, wherein each of said skid units comprises a pair of supports, each of said supports being pivotally coupled to said first member of said associated frame, said supports being spaced apart from each other, each of said supports extending downwardly from said associated frame when said skid units are positioned in said deployed position, each of said supports being oriented collinear with said first member of said associated frame when said skid units are positioned in said stored position.

10. The assembly according to claim 9, further comprising a skid being pivotally coupled between each of said supports, said skid being spaced below said first member of said associated frame when said skid units are positioned in said deployed position wherein said skid is configured frictionally engage a nose of a tread on the staircase, said skid being oriented collinear with said first member of said associated frame when said skid units are positioned in said stored position wherein each of said front and rear wheels are configured to roll along the support surface, each of said skids having a forward end.

11. The assembly according to claim 10, further comprising a handle being movably coupled to said skid corresponding to each of said skid units wherein said handle is configured to be manipulated, said handle urging each of said skid units between said stored position and said deployed position.

12. The assembly according to claim 10, wherein said braking unit comprises a pair of braking wheels, each of said braking wheels being rotatably coupled to an associated one of said skids, each of said braking wheels being aligned with said forward end of said associated skid.

13. The assembly according to claim 12, wherein each of said braking wheels has a peripheral edge, said peripheral edge corresponding to each of said braking wheels having a plurality of notches extending toward a center of said corresponding braking wheel, said notches on each of said braking wheels being spaced apart from each other and being distributed around said corresponding braking wheel, each of said notches on each of said braking wheels being configured to engage the nose on the tread of the staircase when said skid units are positioned in said deployed position.

14. The assembly according to claim 13, further comprising a pair of fingers, each of said fingers being pivotally coupled to an associated one of said supports corresponding to said skid units, each of said fingers having a distal end with respect to said associated support each of said fingers being selectively urged into a locking position such that said distal end corresponding to each of said fingers engages a corresponding one of said notches in an associated one of said braking wheels such that each of said braking wheels is inhibited from rotating, each of said fingers being selectively urged into a releasing position having each of said fingers being spaced from said associated braking wheel.

15. The assembly according to claim 14, further comprising:
a lever; and
a pair of cables, each of said cables being coupled between said lever and an associated one of said fingers such that each of said fingers is urged between said locking position and said releasing position when said lever is manipulated.

16. The assembly according to claim 1, further comprising a lever being hingedly coupled to said dolly wherein said lever is configured to be selectively manipulated.

17. A collapsible dolly assembly being configured to be selectively urged upwardly and downwardly along a staircase thereby facilitating an object to be transported upwardly and downwardly on the staircase, said assembly comprising:
a pair of frames, each of said frames being selectively urged between a deployed position and a collapsed position, each of said frames comprising a first member being pivotally coupled between a second member and a third member, each of said second and third members having a distal end with respect to said first member, said distal end of said third member being slidably coupled to said second member such that each of said frames has a triangular shape when each of said frames is positioned in said deployed position, each of said second and third members being oriented collinear with said first member when each of said frames is in said collapsed position, said pair of frames being spaced apart from each other, said first member corresponding to each of said frames having a first end and a second end, said distal end of said third member being slid downwardly along said second member when said pair of frames is positioned in said collapsed position having said distal end of said third member being aligned with said second end of said first member;
a first rod being coupled between said first member of each of said frames, said first rod being aligned with said second end of each of said frames;
a pair of rear wheels, each of said rear wheels being rotatably coupled to an associated one of said frames wherein each of said rear wheels is configured to roll along a support surface, each of said rear wheels being aligned with said first end of said first member corresponding to said associated one of said frames;
a pair of front wheels, each of said front wheels being rotatably coupled to an associated one of said frames wherein each of said front wheels is configured to roll along the support surface, each of said front wheels being aligned with said second end of said first member corresponding to said associated one of said frames;
a dolly being hingedly coupled to said frame wherein said dolly is configured to support an object thereby facilitating the object to be transported along the support surface, said dolly being selectively positioned between a first position and a second position, said dolly comprising:
a shaft extending between a pair of outward members wherein said shaft is configured to be gripped, each of said outward members having a distal end with respect to said shaft, each of said outward members having a connection point being centrally positioned on said outward members, said connection point corresponding to each of said outward members being pivotally coupled to said distal end of said second member corresponding to an associated one of said frames, a plate being coupled to and extending away from said outward members, said plate being oriented perpendicular to said outward members wherein said plate is configured to have the object placed thereon having the object lying on each of said outward members, said plate being aligned with said distal end corresponding to each of said outward members, and a pair of tabs, each of said tabs being coupled to and extending away from an associated one of said outward members, each of said tabs being positioned closer to said distal end of said outward members than said shaft, each of said tabs having a slot extending inwardly thereon, said slot corresponding to each of said tabs engaging said first rod when said dolly is positioned in said first position to retain said dolly in said first position wherein said plate is configured to be positioned proximate the support surface, each of said tabs releasing said first rod when said dolly is positioned in said second position thereby facilitating said plate to be urged upwardly with respect to the support surface wherein said dolly is configured to substantially lift the object from the support surface;

a pair of skid units, each of said skid units being movably coupled to an associated one of said frames, each of said skid units being selectively positioned in a stored position wherein each of said skid units is configured to be spaced from the support surface, each of said skid units being selectively positioned in a deployed position wherein each of said skid units is configured to frictionally engage a staircase thereby facilitating the object to be urged upwardly and downwardly along the staircase, each of said skid units comprising:

a pair of supports, each of said supports being pivotally coupled to said first member of said associated frame, said supports being spaced apart from each other, each of said supports extending downwardly from said associated frame when said skid units are positioned in said deployed position, each of said supports being oriented collinear with said first member of said associated frame when said skid units are positioned in said stored position, a skid being pivotally coupled between each of said supports, said skid being spaced below said first member of said associated frame when said skid units are positioned in said deployed position wherein said skid is configured frictionally engage a nose of a tread on the staircase, said skid being oriented collinear with said first member of said associated frame when said skid units are positioned in said stored position wherein each of said front and rear wheels are configured to roll along the support surface, each of said skids having a forward end; and a handle being movably coupled to said skid corresponding to each of said skid units wherein said handle is configured to be manipulated, said handle urging each of said skid units between said stored position and said deployed position; and a braking unit being movably coupled to said frame wherein said braking unit is configured to selectively engage the staircase when said skid unit is positioned in said deployed position wherein said braking unit is configured to retain the object at a selected point along the staircase, said braking unit comprising:

a pair of braking wheels, each of said braking wheels being rotatably coupled to an associated one of said skids, each of said braking wheels being aligned with said forward end of said associated skid, each of said braking wheels having a peripheral edge, said peripheral edge corresponding to each of said braking wheels having a plurality of notches extending toward a center of said corresponding braking wheel, said notches on each of said braking wheels being spaced apart from each other and being distributed around said corresponding braking wheel, each of said notches on each of said braking wheels being configured to engage the nose on the tread of the staircase when said skid units are positioned in said deployed position, a lever being hingedly coupled to said dolly wherein said lever is configured to be selectively manipulated, a pair of fingers, each of said fingers being pivotally coupled to an associated one of said supports corresponding to said skid units, each of said fingers having a distal end with respect to said associated support, each of said fingers being selectively urged into a locking position such that said distal end corresponding to each of said fingers engages a corresponding one of said notches in an associated one of said braking wheels such that each of said braking wheels is inhibited from rotating, each of said fingers being selectively urged into a releasing position having each of said fingers being spaced from said associated braking wheel, and a pair of cables, each of said cables being coupled between said lever and an associated one of said fingers such that each of said fingers is urged between said locking position and said releasing position when said lever is manipulated.

* * * * *